(12) United States Patent
Jeung

(10) Patent No.: US 8,033,007 B2
(45) Date of Patent: Oct. 11, 2011

(54) METHOD OF MAKING ROTOR OF BRUSHLESS MOTOR

(75) Inventor: Young-Chun Jeung, Cypress, CA (US)

(73) Assignee: SNTech, Inc. AZ (US)

( * ) Notice: Subject to any disclaimer, the term of this patent is extended or adjusted under 35 U.S.C. 154(b) by 258 days.

(21) Appl. No.: 12/192,054

(22) Filed: Aug. 14, 2008

(65) Prior Publication Data
US 2008/0313884 A1 Dec. 25, 2008

Related U.S. Application Data

(63) Continuation-in-part of application No. 11/896,454, filed on Aug. 31, 2007, now abandoned, and a continuation-in-part of application No. 12/102,539, filed on Apr. 14, 2008, now abandoned.

(30) Foreign Application Priority Data

May 11, 2007 (KR) .................. 10-2007-0045977
Oct. 25, 2007 (KR) .................. 10-2007-0107665

(51) Int. Cl.
*H02K 15/02* (2006.01)
*H02K 15/10* (2006.01)

(52) U.S. Cl. ............ 29/598; 29/596; 29/597; 29/732; 310/156.55

(58) Field of Classification Search ............ 29/596–598, 29/732–736; 310/156.55, 156.38
See application file for complete search history.

(56) References Cited

U.S. PATENT DOCUMENTS

| 2,192,985 A | 3/1940 | Reis |
| 2,488,729 A | 11/1949 | Kooyman |
| 3,246,187 A | 4/1966 | Iemura |
| 3,299,335 A | 1/1967 | Wessels |
| 3,444,406 A | 5/1969 | Aha |
| 3,457,486 A | 7/1969 | Soeda |
| 3,531,702 A | 9/1970 | Hill |
| 3,604,960 A | 9/1971 | Krestel |
| 3,787,014 A | 1/1974 | Story et al. |

(Continued)

FOREIGN PATENT DOCUMENTS

EP 1050946 A2 11/2000

(Continued)

OTHER PUBLICATIONS

Notice of Allowance dated Oct. 28, 2010 in U.S. Appl. No. 12/102,539 which is the parent application of this application—7 pg.

*Primary Examiner* — Minh Trinh
(74) *Attorney, Agent, or Firm* — Knobbe Martens Olson & Bear LLP

(57) ABSTRACT

Some embodiments of the present disclosure provide a method of making a rotor of an electric brushless motor configured to be light weight and prevent vibrations generated during an operation of the motor to be transferred to the shaft of the rotor. The method includes providing a shaft elongated in a rotational axis, providing a single body magnet comprising alternately magnetized portions, and providing a vibration absorption portion interposed between the shaft and single body magnet. The vibration absorption portion absorbs vibrations generated during the operation of the motor and may include an elastic or a non-elastic material. The method further includes providing a non-elastic portion configured to inhibit the expansion of the vibration absorption portion when the vibration portion is elastic.

16 Claims, 13 Drawing Sheets

U.S. PATENT DOCUMENTS

| | | | |
|---|---|---|---|
| 3,878,809 A | 4/1975 | Ray | |
| 3,909,647 A | 9/1975 | Peterson | |
| 4,004,202 A | 1/1977 | Davis | |
| 4,093,906 A | 6/1978 | Draxler | |
| 4,271,385 A | 6/1981 | Azusawa | |
| 4,384,224 A | 5/1983 | Spitler et al. | |
| 4,389,606 A | 6/1983 | Detering | |
| 4,544,856 A | 10/1985 | King | |
| 4,587,450 A | 5/1986 | Ozaki | |
| 4,642,885 A | 2/1987 | King | |
| 4,668,898 A | 5/1987 | Harms et al. | |
| 4,712,030 A | 12/1987 | Lakin et al. | |
| 4,745,318 A | 5/1988 | Ivanics | |
| 4,774,448 A | 9/1988 | Yoshitomi | |
| 4,874,975 A | 10/1989 | Hertrich | |
| 4,888,530 A | 12/1989 | Radik et al. | |
| 4,954,736 A | 9/1990 | Kawamoto et al. | |
| 5,200,662 A | 4/1993 | Tagami et al. | |
| 5,223,761 A | 6/1993 | Larsen | |
| 5,237,737 A | 8/1993 | Zigler et al. | |
| 5,243,732 A | 9/1993 | Koharagi et al. | |
| 5,345,130 A | 9/1994 | Kliman et al. | |
| 5,492,273 A | 2/1996 | Shah | |
| 5,500,994 A | 3/1996 | Itaya | |
| 5,528,095 A | 6/1996 | Strobl | |
| 5,559,407 A | 9/1996 | Dudley et al. | |
| 5,663,616 A | 9/1997 | Stringfellow et al. | |
| 5,680,021 A | 10/1997 | Hollenbeck | |
| 5,739,614 A | 4/1998 | Suzuki et al. | |
| 5,767,635 A | 6/1998 | Steffens et al. | |
| 5,801,463 A | 9/1998 | Suzuki et al. | |
| 5,818,194 A | 10/1998 | Nordby | |
| 5,929,589 A | 7/1999 | Suzuki et al. | |
| 6,005,320 A | 12/1999 | Kim et al. | |
| 6,079,786 A | 6/2000 | Woodward et al. | |
| 6,209,622 B1 | 4/2001 | Lagace et al. | |
| 6,310,452 B1 | 10/2001 | Deck et al. | |
| 6,329,736 B1 | 12/2001 | Bernauer et al. | |
| 6,351,091 B1 | 2/2002 | Heinkel et al. | |
| 6,369,536 B2 | 4/2002 | Beifus et al. | |
| 6,376,954 B1 | 4/2002 | Nunes, Jr. | |
| 6,404,086 B1 | 6/2002 | Fukasaku et al. | |
| 6,441,521 B1 | 8/2002 | Dombrovski et al. | |
| 6,462,440 B1 | 10/2002 | Asao et al. | |
| 6,603,231 B2 | 8/2003 | Dombrovski et al. | |
| RE38,406 E | 1/2004 | Faris et al. | |
| 6,700,297 B2 | 3/2004 | Hsu et al. | |
| 6,718,617 B2 * | 4/2004 | Drexlmaier | 29/598 |
| 6,791,222 B1 | 9/2004 | Maslov et al. | |
| 6,801,013 B2 | 10/2004 | Woodward et al. | |
| 6,864,657 B1 | 3/2005 | Lungu | |
| 6,891,306 B1 | 5/2005 | Soghomonian et al. | |
| 6,924,611 B1 | 8/2005 | Tzeng et al. | |
| 6,952,088 B2 | 10/2005 | Woodward et al. | |
| 7,015,663 B1 | 3/2006 | Tzeng et al. | |
| 7,042,180 B2 | 5/2006 | Terry et al. | |
| 7,075,203 B2 | 7/2006 | Kuwert | |
| 7,131,398 B2 | 11/2006 | Cohen et al. | |
| 7,148,598 B2 * | 12/2006 | Ionel et al. | 310/156.55 |
| 7,268,505 B2 | 9/2007 | Pant et al. | |
| 7,272,302 B2 | 9/2007 | Woodward et al. | |
| 7,296,753 B1 | 11/2007 | Zucker | |
| 7,327,118 B2 | 2/2008 | Pant et al. | |
| 7,378,821 B2 | 5/2008 | Simpson, III | |
| 7,443,119 B2 | 10/2008 | Liu | |
| 7,458,228 B2 | 12/2008 | Lagace et al. | |
| 7,590,334 B2 | 9/2009 | Yabusaki et al. | |
| 2001/0048261 A1 | 12/2001 | Kojima et al. | |
| 2002/0047348 A1 | 4/2002 | Ohiwa et al. | |
| 2002/0121837 A1 | 9/2002 | Dombrovski et al. | |
| 2003/0001442 A1 | 1/2003 | Hsu | |
| 2003/0080772 A1 | 5/2003 | Giacomini et al. | |
| 2003/0173924 A1 | 9/2003 | Blase et al. | |
| 2004/0095035 A1 | 5/2004 | Sogabe et al. | |
| 2004/0232871 A1 | 11/2004 | Deck et al. | |
| 2005/0001502 A1 | 1/2005 | Yamazaki et al. | |
| 2005/0029976 A1 | 2/2005 | Terry et al. | |
| 2005/0116392 A1 | 6/2005 | Vesci et al. | |
| 2005/0162108 A1 | 7/2005 | Pant et al. | |
| 2005/0194918 A1 | 9/2005 | Takeuchi | |
| 2005/0253744 A1 | 11/2005 | Kern | |
| 2006/0113856 A1 | 6/2006 | Tanno et al. | |
| 2006/0113857 A1 | 6/2006 | Honkura et al. | |
| 2006/0186751 A1 | 8/2006 | Kim et al. | |
| 2006/0244333 A1 | 11/2006 | Jeung | |
| 2006/0291820 A1 | 12/2006 | Kobayashi | |
| 2007/0024250 A1 | 2/2007 | Simpson, III | |
| 2007/0046124 A1 | 3/2007 | Aydin et al. | |
| 2007/0247091 A1 | 10/2007 | Maiocchi | |
| 2008/0084171 A1 | 4/2008 | Leehey et al. | |
| 2008/0315691 A1 | 12/2008 | Jeung | |
| 2009/0039807 A1 | 2/2009 | Yabusaki et al. | |
| 2009/0039820 A1 | 2/2009 | Milano et al. | |
| 2009/0058202 A1 | 3/2009 | Jeung | |
| 2009/0102305 A1 | 4/2009 | Lu | |
| 2009/0108686 A1 | 4/2009 | Jeung | |
| 2009/0267549 A1 | 10/2009 | Kitagawa | |
| 2009/0284201 A1 | 11/2009 | Jeung | |
| 2010/0225257 A1 | 9/2010 | Masfaraud et al. | |

FOREIGN PATENT DOCUMENTS

| | | | |
|---|---|---|---|
| FR | 2896638 A | | 7/2007 |
| GB | 2015266 A | | 9/1979 |
| JP | 54001810 A | | 1/1979 |
| JP | 55071162 A | | 5/1980 |
| JP | 56117567 A | | 9/1981 |
| JP | 56157249 A | | 12/1981 |
| JP | 58112449 A | | 7/1983 |
| JP | 58119754 | | 7/1983 |
| JP | 01-129741 A | | 5/1989 |
| JP | 5300770 A | | 11/1993 |
| JP | 06086485 A | | 3/1994 |
| JP | 2001-268831 A | | 9/2001 |
| JP | 03248248 B2 | | 1/2002 |
| JP | 2004-023823 A | | 1/2004 |
| JP | 2004-56887 A | | 2/2004 |
| JP | 2004-304928 A | | 10/2004 |
| JP | 2005-168241 A | | 6/2005 |
| KR | 10-2006-0115930 A | | 11/2006 |
| KR | 10-0696854 B1 | | 3/2007 |
| KR | 10-2008-0019807 | | 3/2008 |
| KR | 10-2008-0099988 | | 11/2008 |
| KR | 10-2009-0041899 | | 4/2009 |
| WO | WO 2007000114 A1 | | 1/2007 |
| WO | 2009/140419 A2 | | 11/2009 |

* cited by examiner

METHOD OF MAKING ROTOR OF BRUSHLESS MOTOR

CROSS-REFERENCE TO RELATED APPLICATIONS

This application is a continuation-in-part application of U.S. application Ser. No. 11/896,454, filed on Aug. 31, 2007, now abandoned, and U.S. application Ser. No. 12/102,539, filed on Apr. 14, 2008, now abandoned. This application further claims priority to and the benefit of Korean Patent Application No. 10-2007-0045977, filed on May. 11, 2007 in the Korean Intellectual Property Office. This application further claims priority to and the benefit of Korean Patent Application No. 10-2007-0107665, filed on Oct. 25, 2007in the Korean Intellectual Property Office. The disclosures of U.S. application Ser. No. 11/896,454, U.S. application Ser. No. 12/102,539, Korean Patent Application No. 10-2007-0045977, and Korean Patent Application No. 10-2007-0107665 are incorporated herein by reference in their entirety.

BACKGROUND

1. Field

The present disclosure relates to method of making a rotor of an electric motor.

2. Description of the Related Technology

Generally a rotor of an electric brushless motor uses a permanent magnet and a rotor core of a ferromagnetic bulk or an electric steel sheet in order to form a magnetic circuit. However, when the permanent magnet rotor generates a rotation torque due to its interactions with an alternating magnetic field of a stator, there are vibrations generated in air gaps between the rotor and the stator. These vibrations can amplify to noise and/or be transferred to the load of the motor to cause damage or inefficiencies. Also, the weight of the ferromagnetic bulk or electric steel used as rotor core increases the weight of the motor and reduces efficiency in the application of the motor.

SUMMARY

Some embodiment of the disclosure provide a method of making a rotor of an electric brushless motor configured to be light weight and reduce vibrations to be transferred to the shaft of the rotor. The brushless motor can include an embodiment of the rotor of the disclosure and a stator comprising at least two electric magnets. One method of a making a rotor includes providing a shaft elongated in a rotational axis, providing a vibration absorption portion outside a portion of the shaft, and providing one or more body magnets such that the vibration absorption material is interposed between the elongated shaft and the one or more body magnets.

The method can further include forming an engagement enhancing layer on a portion of the shaft. In some embodiments the shaft includes a roughened surface and the engagement enhancing layer is formed at least on the roughened surface of the shaft. Forming of the engagement enhancing layer can include injection molding onto the shaft. With the engagement enhancing layer, the method of making the rotor includes forming the vibration absorption portion over the engagement enhancing layer so as to integrate the vibration absorption portion with the shaft, wherein forming the vibration absorption portion includes injection molding. A portion of the vibration absorption portion can contact a portion of the shaft. In another embodiment of the disclosure, the vibration absorption portion includes a pored structure wherein providing the vibration absorption portion outside the shaft includes engaging the pored structure with the shaft with or without an engagement enhancing layer between the shaft and vibration absorption portion.

In one embodiment of the method the vibration absorption portion includes an elastic material, wherein the method further includes providing a non-elastic portion outside the vibration absorption portion and the non-elastic portion does not include an elastic material. The single body magnet is subsequently engaged with the non-elastic portion. In the foregoing embodiment of the method the non-elastic portion includes a cylindrical portion, wherein providing the non-elastic portion outside the vibration absorption portion includes arranging the non-elastic portion and the shaft such that the non-elastic portion and the shaft define a space therebetween and injecting an elastic material into the space so as to form the vibration absorption portion interposed between the non-elastic portion and the shaft. The non-elastic portion can include a plurality of through holes in the cylindrical portion, wherein the elastic material fills the through holes and protrudes outwardly and forms a plurality of protrusions outside the non-elastic portion. The plurality of protrusions can engage with the single body magnet.

In another embodiment of the method, the vibration absorption portion includes an elastic material, wherein the non-elastic portion is annular and surrounding the vibration absorption portion. In embodiments the non-elastic portion is not annular while being interposed between the single body magnet and the vibration absorption portion. The non-elastic portion can include a ferromagnetic material or the non-elastic portion may not include a ferromagnetic material. When the non-elastic portion does not comprise a ferromagnetic material and made of plastic, it may include injection molding over the vibration absorption portion.

In one embodiment of the method the non-elastic portion includes at least one of protrusion and recess on an outer circumference, wherein the body magnet includes at least one counterpart configuration configured to engage with the at least one of protrusion and recess. One of the embodiments of the method further includes a non-elastic portion interposed between the one or more body magnet and the vibration absorption portion, wherein the non-elastic portion includes one or more annular layers. The non-elastic portion can engage with the vibration absorption portion, wherein the non-elastic portion includes at least one of protrusion and recess on an inner circumference and the vibration absorption portion includes at least one counterpart configuration configured to engage with the at least one of protrusion and recess.

Some embodiments for making the rotor as described are used to make an electric motor. One embodiment of method of making a motor includes providing a rotor, providing a stator comprising a plurality of stator poles, and assembling the rotor and the stator such that the rotor is to rotate relative to the plurality of stator poles. The rotor includes a shaft, one or more body magnets comprising alternately magnetized portions, and a vibration absorption portion interposed between the shaft and single body magnet. The rotor is made using a method that includes providing a shaft elongated in an rotational axis, providing a vibration absorption portion outside a portion of the shaft, and providing one or more body magnets such that the vibration absorption material is interposed between the elongated shaft.

BRIEF DESCRIPTION OF THE DRAWINGS

The above and/or other aspects and advantages of the present disclosure will become apparent and more readily appreciated from the following detailed description, taken in conjunction with the accompanying drawings of which.

DETAILED DESCRIPTION OF THE DRAWINGS

A rotor of an electric motor in described method of making the electric motor includes providing a rotor of the disclosure and a stator including a plurality of magnetic poles and assembling the rotor and the stator such that the rotor is to rotate relative to the plurality of the stator poles.

The rotor includes a ring magnet completing magnetic circuits with a stator of the motor to operate the brushless motor. The rotor can be light weight and thus improve the motor's power to weight ratio. The rotor includes a vibration absorption portion comprising a vibration absorbing material. The vibration absorption portion of the rotor is configured to absorb the vibration caused by an unbalance in magnetic flux densities of gaps in the motor and magnetic vibration caused by pole shift of a stator in the motor. The vibration absorption portion of the rotor is configured to reduce the vibration from being delivered to a shaft of the rotor and subsequently to a load of the motor. The rotor further includes a non-elastic portion between the single body magnet and the vibration absorption portion to inhibit the thermal expansion of the vibration absorption portion that can cause damage to the single body magnet.

Figure 1:
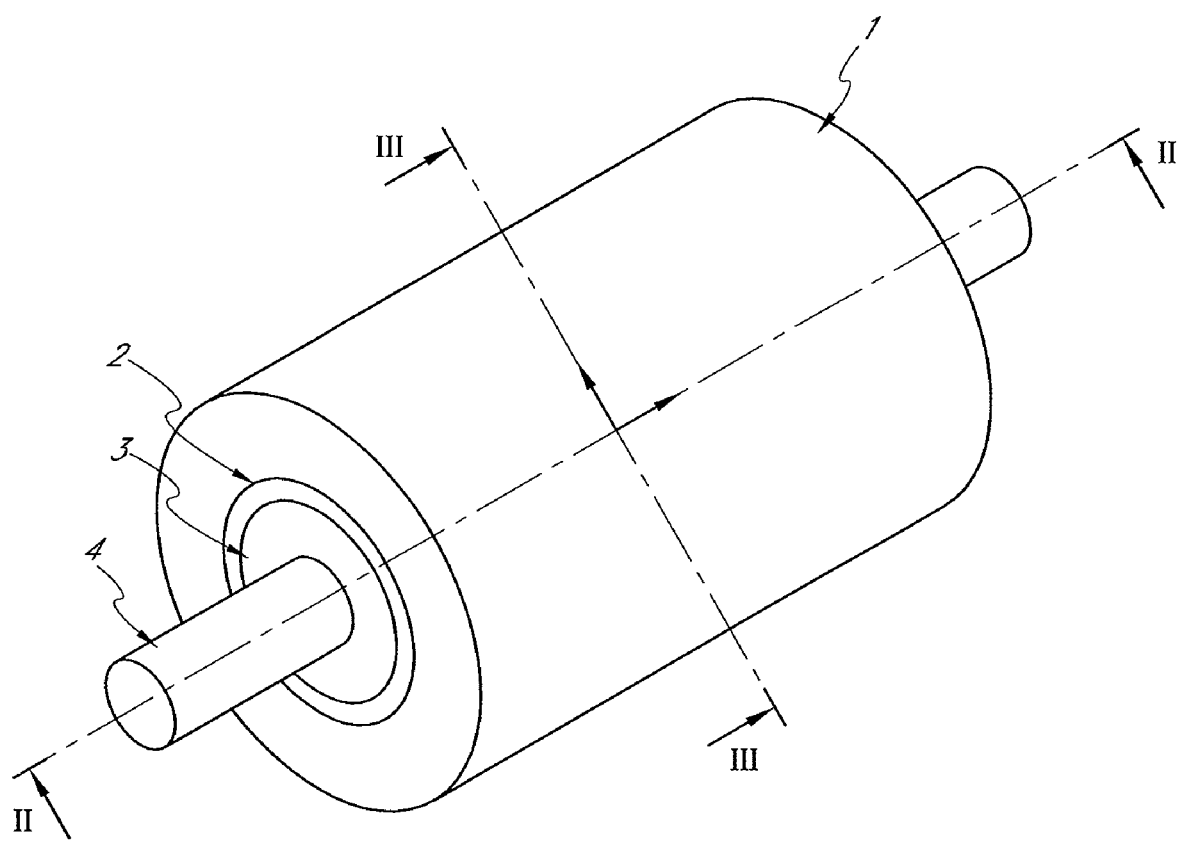
FIG. 1 is a perspective view of the rotor of a brushless motor according to an embodiment of the disclosure.
Figure 2:
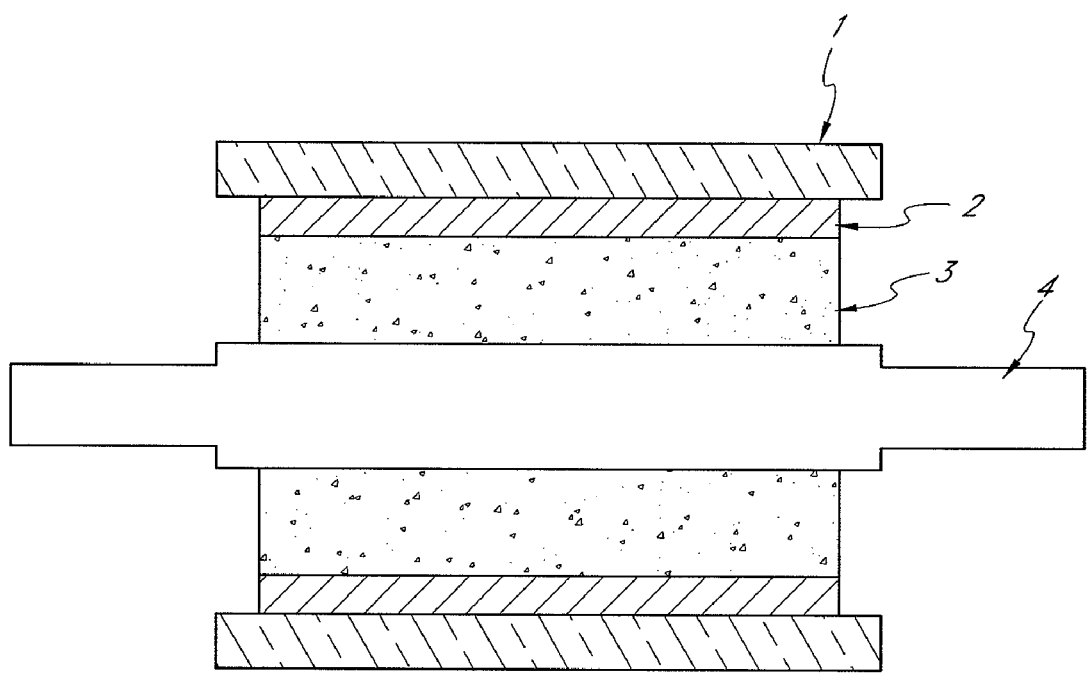
FIG. 2 is a cross-sectional view of the rotor of FIG. 1 in a plane passing through the II axis.

FIG. 1 and FIG. 2 illustrate the rotor of a brushless motor. FIG. 1 as shown is a perspective view of the rotor. In the embodiment as shown in FIG. 1, the rotor includes a body magnet 1, a non-elastic portion 2, a vibration absorption portion 3, and a shaft 4. Two axes are illustrated in FIG. 1 for defining orientation of cross-sections to follow. Axis II is an axis coinciding with the rotational axis of the shaft 4. Axis III is an axis perpendicular to axis II that lies in the midpoint of the rotor in the longitudinal direction.

FIG. 2 is a cross-section of the rotor in a plane passing through the axis II. In the illustrated embodiment, the shaft 4 is surrounded by the vibration absorption portion 3. Subsequently, the vibration absorption portion 3 is surrounded by the non-elastic portion 2 and finally the non-elastic portion 2 is surrounded by single body magnet 1.

Figure 3:
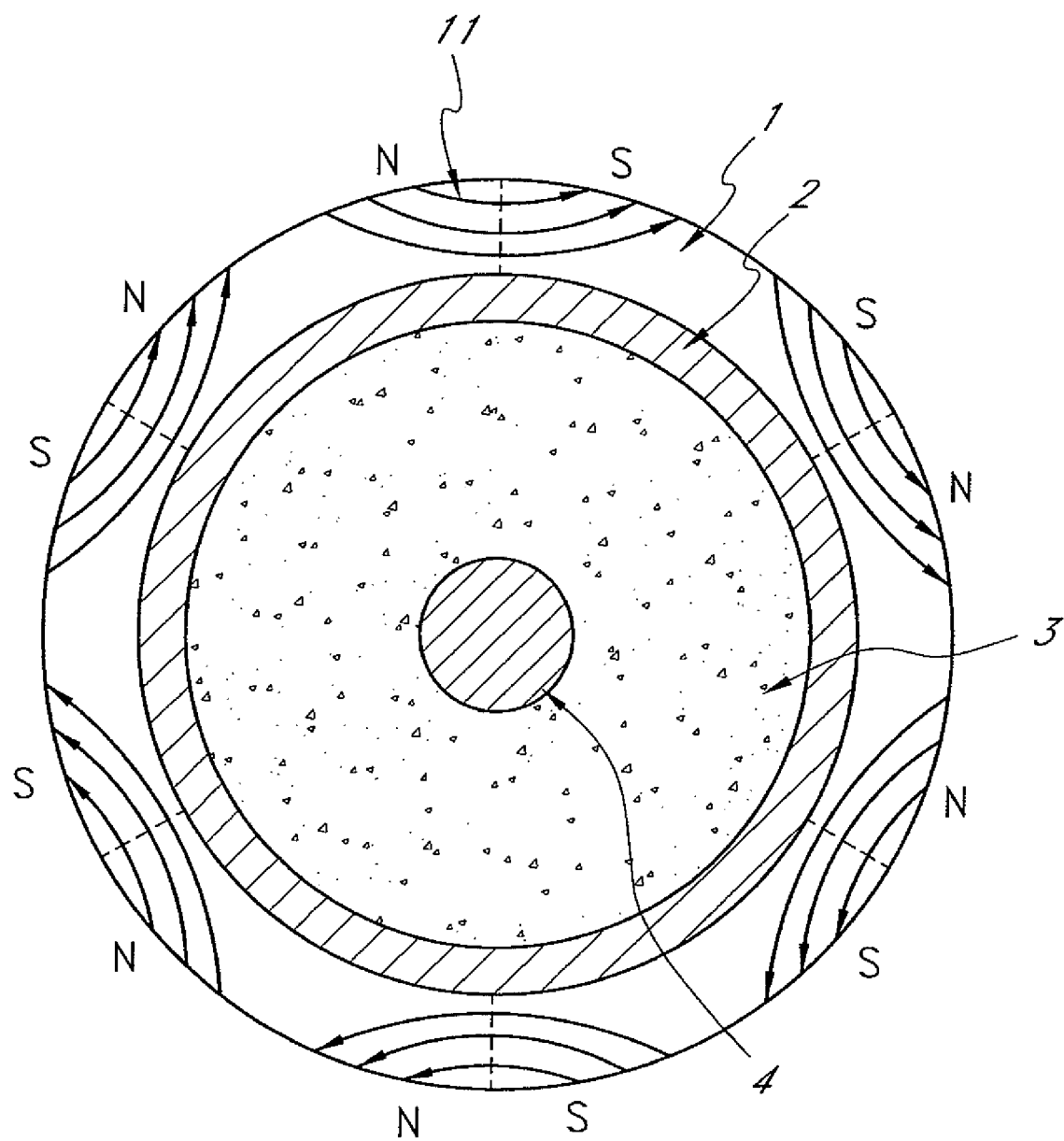
FIG. 3 is a cross-sectional view of the rotor of FIG. 1 in a plane passing through the III axis.
Figure 4:
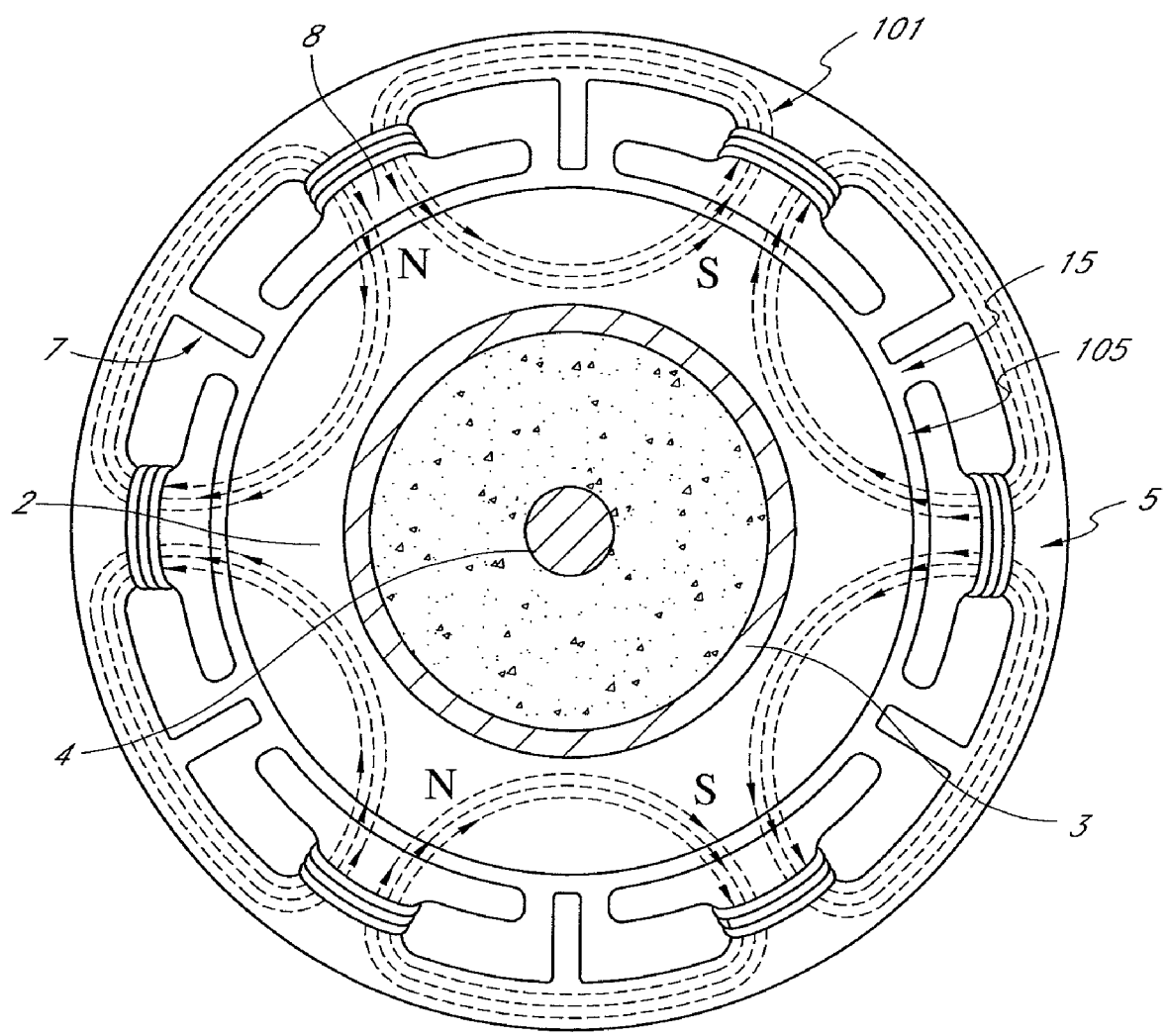
FIG. 4 illustrates a magnetic circuit of the rotor and a stator of the motor according to an embodiment of the disclosure.

FIG. 3 and FIG. 4 illustrate the magnetic circuit forming in the body magnet during the operation of the brushless motor. FIG. 3 is a cross-section of the rotor in the plane passing through the axis III in FIG. 1. Magnetic flux fields 11 are formed inside the body magnet 1 with the electromagnets of the stator. There is a plurality of poles formed on the body magnet, where the poles are extending generally parallel to each other as shown.

FIG. 4 is a cross-section showing the complete magnetic circuit between the rotor and the stator 5 of the motor comprising at least two electric magnets are shown together in the plane passing through axis III of the rotor of FIG. 1. The magnetic field loop 101 is formed within the stator 5 and the body magnet 1 of the rotor during the operation of the motor. The single body magnet 1 allows the magnetic field loop 101 to be formed without an addition of the substantially heavy ferromagnetic core. During the operation of the motor, there are vibrations caused by unbalance among magnetic flux densities of slots 15 in the stator and the gaps 105 between the stator and the rotor. There are also magnetizing vibration caused by pole shifts of the stator. When these vibrations are transferred to the shaft of the rotor and consequently to the load, the vibration can amplify to noise and can further amplify into resonance noise. This can increase the stress on the bearings of the motor and reduce the operational life time of the motor. The vibration absorbing portion absorbs these vibrations and minimizes the vibrations from being transferred to the shaft. The stator 5 also comprises extra poles 7 that reduce cogging caused by bridge fields generated between wound poles 8.

Figure 8:
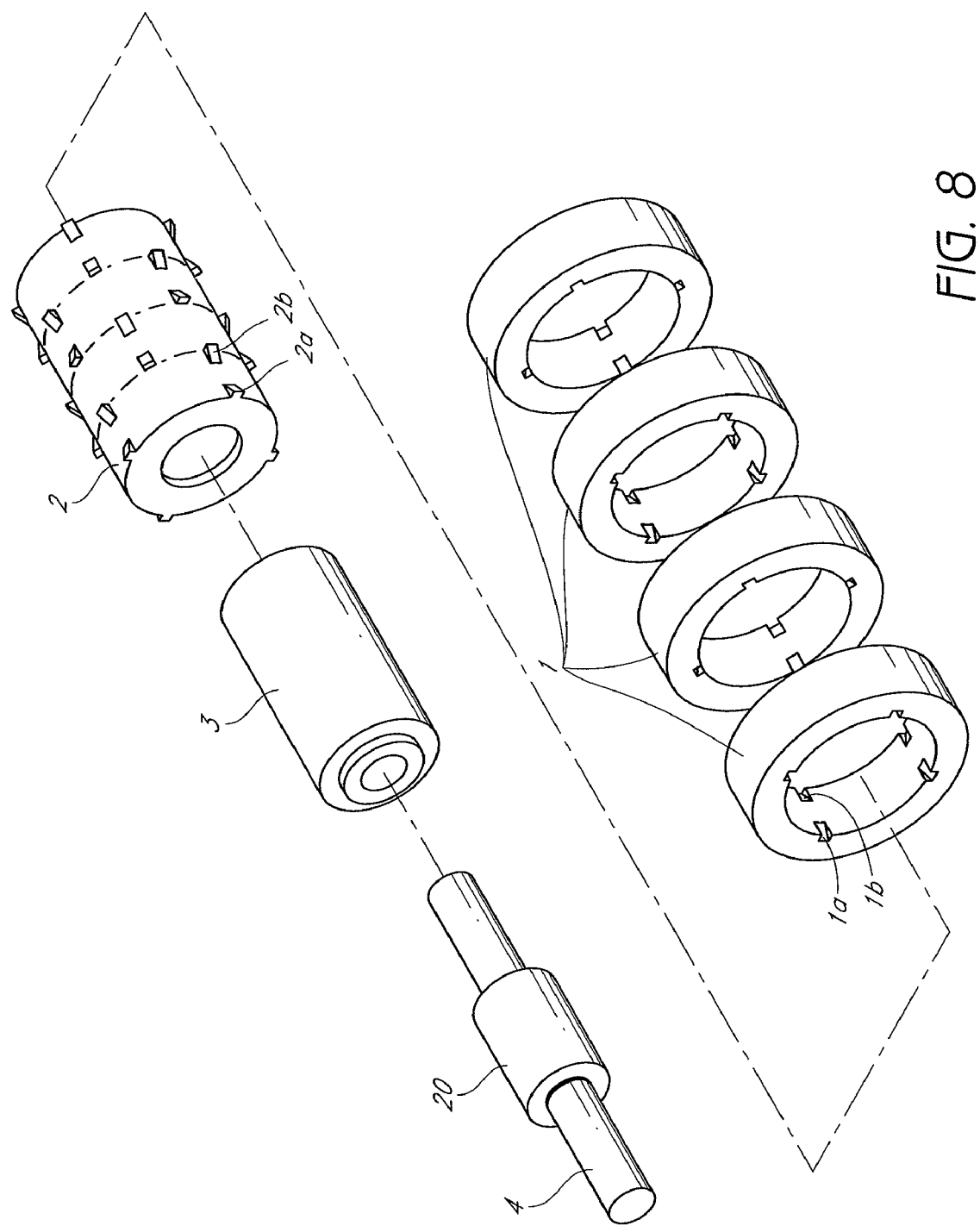
FIG. 8 is an exploded perspective view showing the assembly of the rotor of FIG. 7.
Figure 9:
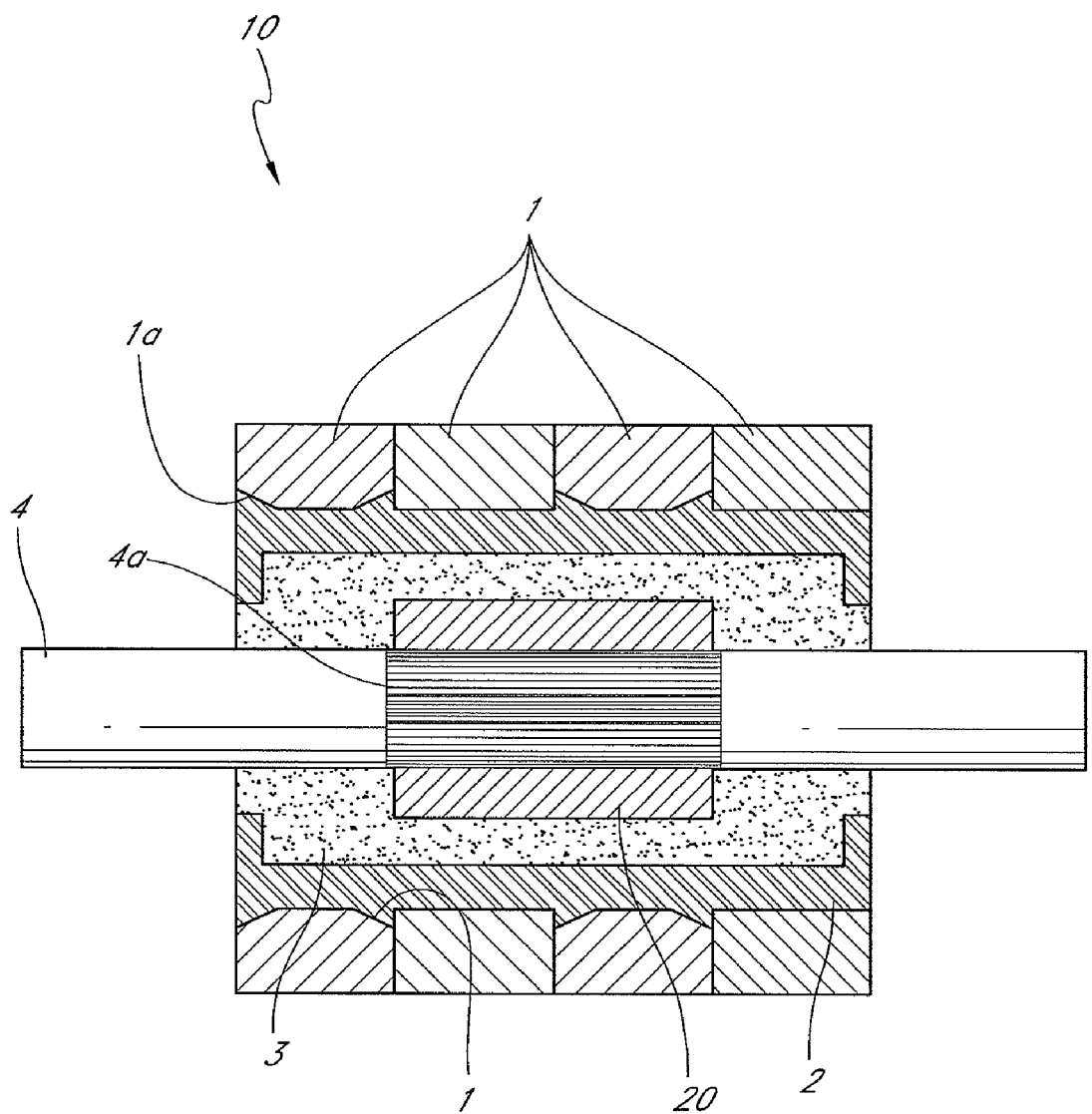
FIG. 9 is a cross-sectional view showing the assembly of the rotor of FIG. 7.
Figure 10:
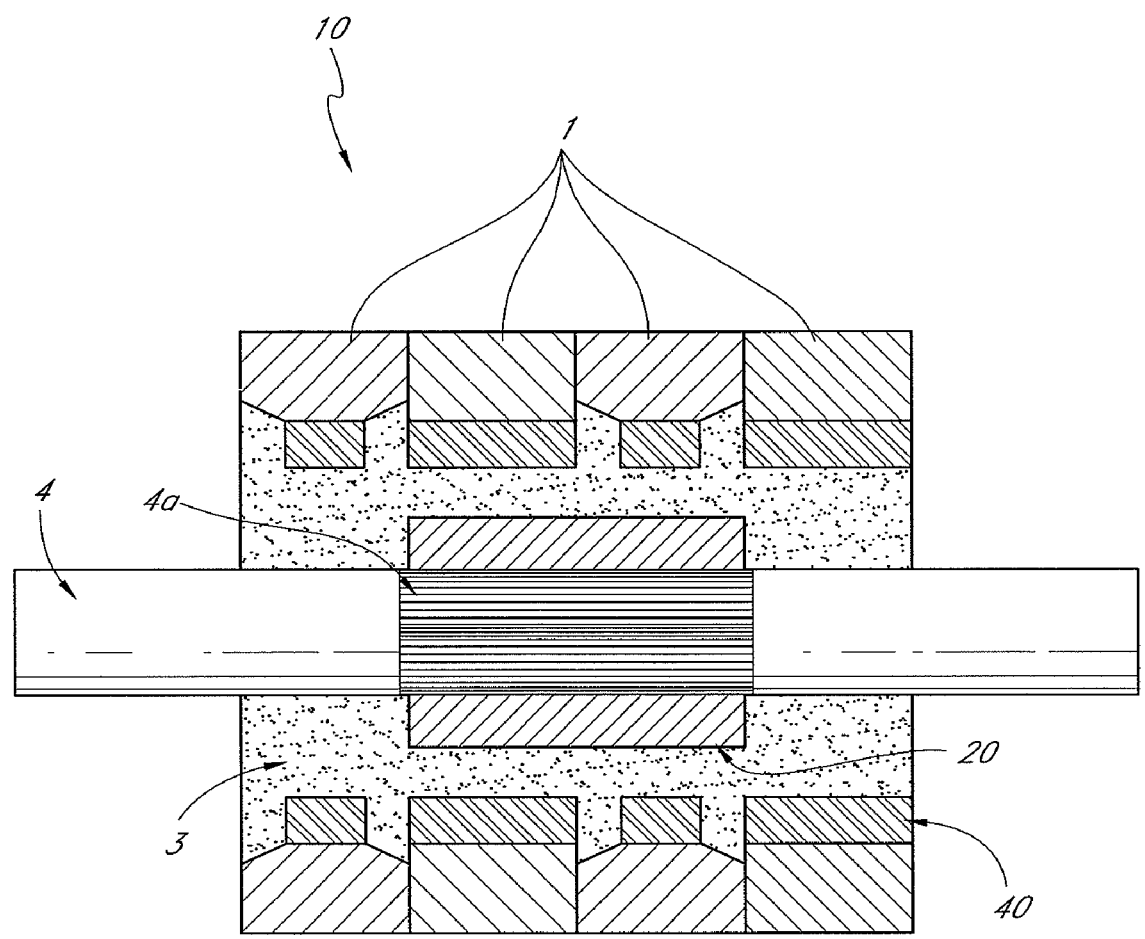
FIG. 10 is a cross-sectional view showing the assembly of the rotor in another embodiment.

In the illustrated embodiment of the assembled rotor 10 as shown in FIG. 7 through FIG. 10, the shaft 4 is a solid rod. In other embodiments the shaft can be a hollow tube. The cross-section can be circular or other shapes. The shaft is configured to rotate along a pivot and consequently drive the rotor 10 to rotate. In one illustrated embodiment as shown in FIG. 10 the roughened surface 4a is provided on the surface of the shaft 4 so as to promote better adhesion of additional layers that can form around the shaft. In one of the embodiments a plastic engagement enhancing layer 20 can be injection molded around the roughened surface 4a of the shaft 4 configured to provide better adhesion of additional portions to be formed. The shaft 4 includes a high strength and durable material. Examples include material such as metal, high strength plastic, etc.

In the illustrated embodiment as shown in FIGS. 7 through 10, vibration absorption portion 3 includes an annular body and is interposed between the shaft 4 and the single body magnet 1. The vibration absorption portion 3 contacts and is engaged with the shaft 4. In some embodiments the vibration absorption portion 3 is integrated with the shaft 4 via the engagement enhancing layer 20 fixed to the circumference of the shaft 4 so as to form the vibration absorption 3 portion around the shaft 4. In another embodiment the vibration absorption portion 3 includes one more annular layers of identical or different material. In other embodiments the vibration absorption portion 3 is not annular while being interposed between the shaft 4 and the single body magnet 1.

The vibration absorption portion 3 includes light weight, noise and vibration absorbing material. In one of the embodiments the vibration absorption portion includes an elastic material. The examples include rubber, resin such as silicon, etc. The resin is injection molded to form the vibration absorption portion 3. When the vibration absorption portion 3 includes an elastic material, a non-elastic portion 2 is provided outside the vibration absorption portion 3, wherein the non-elastic portion 2 does not includes an elastic material, wherein the single body magnet 1 is subsequently engages with the non-elastic portion 2.

Figure 5:
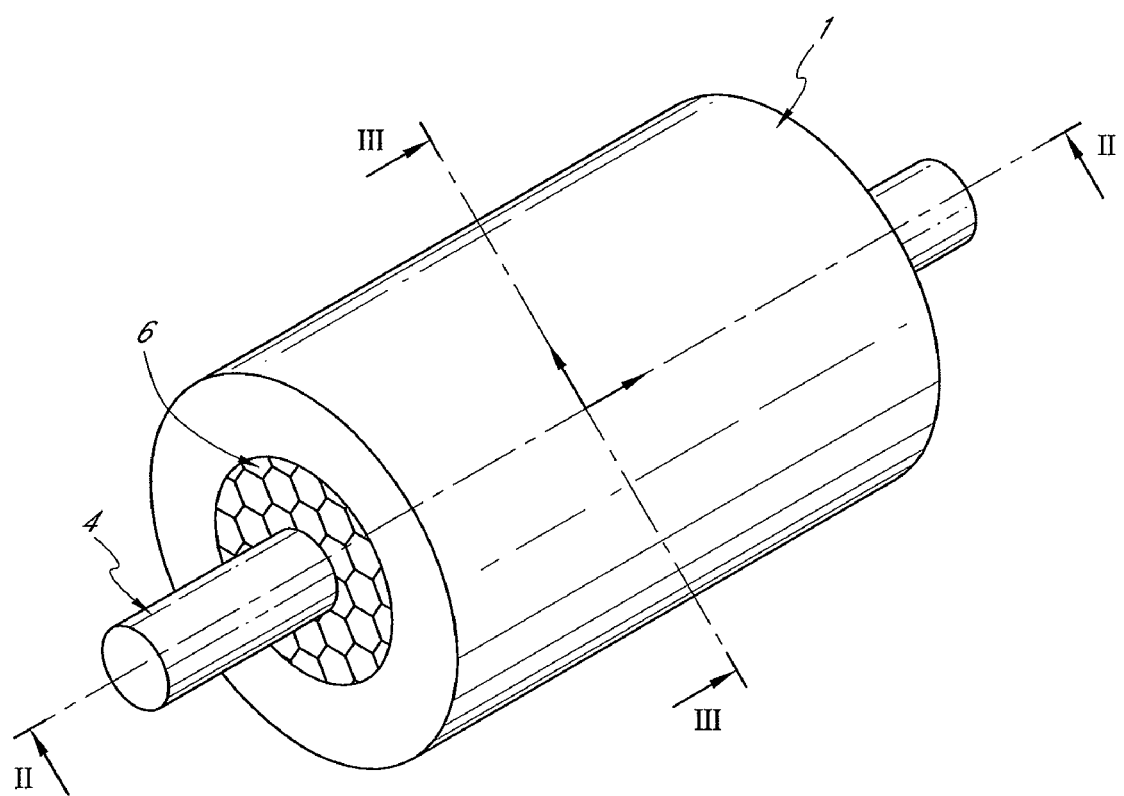
FIG. 5 is a perspective view of the rotor of a brushless motor according to another embodiment of the disclosure.
Figure 6:
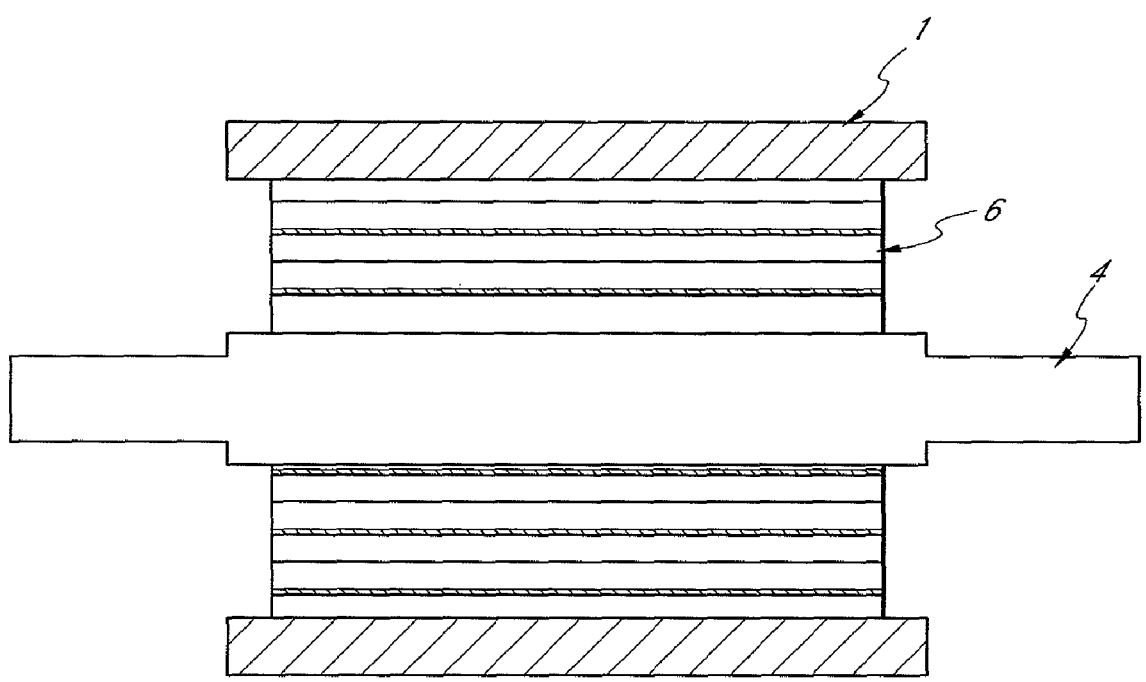
FIG. 6 is a cross-sectional view of the rotor of FIG. 5

In another embodiment shown in FIGS. 5 and 6, the vibration absorption portion includes a pored structure 6, wherein providing the vibration absorption portion outside the shaft includes engaging the pored structure with the shaft 4 with or without an engagement enhancing layer 20 between the shaft 4 and vibration absorption portion. The porous structure 6 includes a plurality of networked walls defining pores. The examples of the material include honeycombed or corrugated paper, wood, ceramic, plastic, etc. This portion can be fixed to the shaft 4 by via adhesives. When the vibration absorbing portion 6 includes material substantially free of being elastic as mentioned, the foregoing non-elastic portion can be omitted from the configuration of the rotor 10.

In the illustrated embodiments as shown in FIGS. 7 through 10, the rotor 10 includes non-elastic portion 2 interposed between the single body magnet 1 and the vibration absorption portion 3, wherein the non-elastic portion does not include an elastic material. The non-elastic portion 2 is substantially non-elastic and configured to minimize transferring of a force of radial expansion of the vibration absorption portion 3 to the single body magnet 1 while the rotor 10 is rotating. The non-elastic portion 2 can include one or more annular layers. In one embodiment the non-elastic portion 2 can be annular and surrounding the vibration absorption portion 3. The non-elastic portion 2 can include a cylindrical portion, wherein providing the non-elastic portion outside the vibration absorption portion 3 includes arranging the non-elastic portion 2 and the shaft 4 such that the non-elastic portion and the shaft define a space therebetween and elastic material is injected into the space to form the vibration absorption portion 3. In other embodiment the non-elastic portion 2 is not annular while being interposed between the single body magnet 1 and the vibration absorption portion 3.

The non-elastic portion 2 is engaged with the vibration absorption portion 3. The non-elastic portion 2 includes at least one of protrusion and recess on an inner circumference, wherein the vibration absorption portion 3 includes at least on counterpart configuration configured to engage with at least one of protrusion and recess. The non-elastic portion 2 is configured to be engaged with the single body magnet 1 as well. The non-elastic portion 2 includes at least one of protrusion 2a and 2b on the outer circumference, wherein the single body magnet 1 includes at least one counterpart configuration, indentations 1a and 1b, configured to engage with the at least on protrusion 2a and 2b.

Some embodiments include a ferromagnetic material for the non-elastic portion 2. Other embodiments do not include a ferromagnetic material. Characteristics of the material used are relatively high strength, relatively heat resistant, and having relatively low thermal expansion coefficient. The non-elastic portion 2 comprising low thermal expansion coefficient material is configured to inhibit the expansion of itself and the expansion of the vibration absorption portion 3 during an operation of motor. The expansion of the two portions can occur due to thermal expansion of the materials due to heat produced during operation of the motor. Some examples used for non-elastic portion 2 include a plastic material and/or a metal such as aluminum, steel, and etc.

Figure 7:
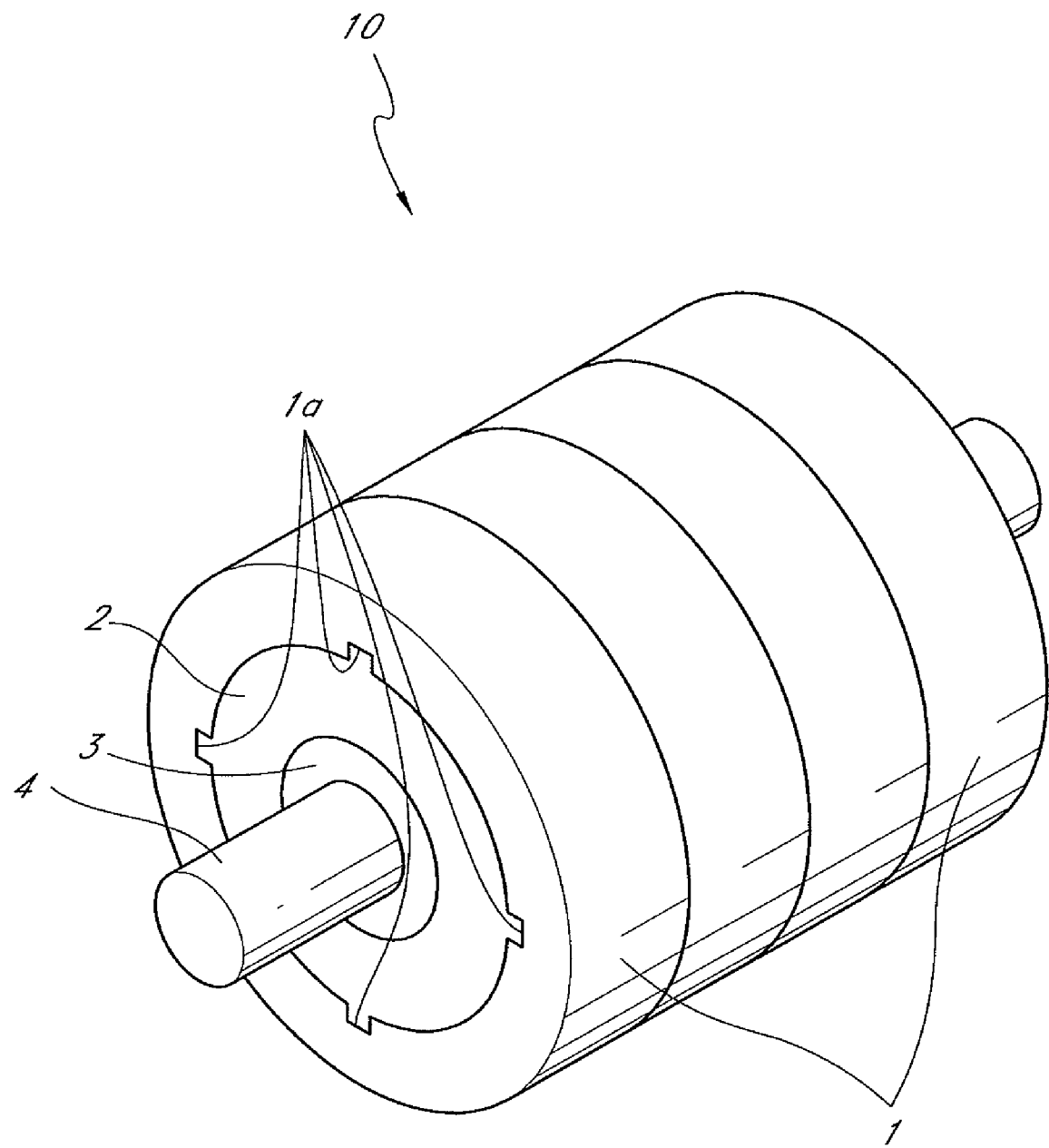
FIG. 7 is a perspective view showing an assembled model of the rotor of a brushless motor according to an embodiment of the disclosure.

In the illustrated embodiment as shown in FIGS. 7 through 9, when the non-elastic portion 2 includes a plastic material the plastic is injection molded over the vibration absorbing portion 3. This portion includes protrusions 2a and 2b to correspond to the indentations 1a and 1b in the body magnet 1. The protrusions 2a and 2b are configured to engage in the indentations 1a and 1b of the body magnet 1 to securely fix the magnet onto the non-elastic portion 2.

In one embodiment the non-elastic portion 2 includes of aluminum. The portion can be glued on the surface of the vibration absorption portion 3. In the illustrated embodiment as shown in FIG. 10 the aluminum portion 40 can have through holes corresponding to the indentations 1a and 1b of the outer single body magnet 1. And the non-elastic aluminum portion 40 can be injection molded together with the inner vibration absorption portion 3 and the melted resin of the vibration absorption portion 3 fills the through holes in the aluminum portion 40 and protrude outwardly and forms protrusions outside the non-elastic portion (aluminum) corresponding to the indentations 1a and 1b of the body magnet 1.

In the illustrated embodiment as shown in FIGS. 7 through 10, the body magnet 1 includes polar anisotropic magnet. The magnet is configured to be thick enough to complete the magnetic field 101 without a ferromagnetic core inside the magnet. In one embodiment the body magnet is a single body annular magnet. In other embodiments body magnet includes two or more annular magnet portions with the length from about 25 mm to about 30 mm aligned together. There can be indentations 1a and 1b formed on the inner surface of the single body magnet that are aligned with the protrusions 2a and 2b on the outer circumference of non-elastic portion 2. The alignment of the indentations 1a and 1b of the single body magnet 1 and the protrusions 2a and 2b of the non-elastic portion 2 is configured to fix the single body magnet 1 on the non-elastic portion 2. When the vibration absorption portion 6 (in FIG. 5) substantially free of an elastic material is used for the vibration absorption portion and, thus, the on-elastic portion 2 is absent, the body magnet 1 can be fixed on vibration absorption portion 6 with adhesives.

Figure 11A:
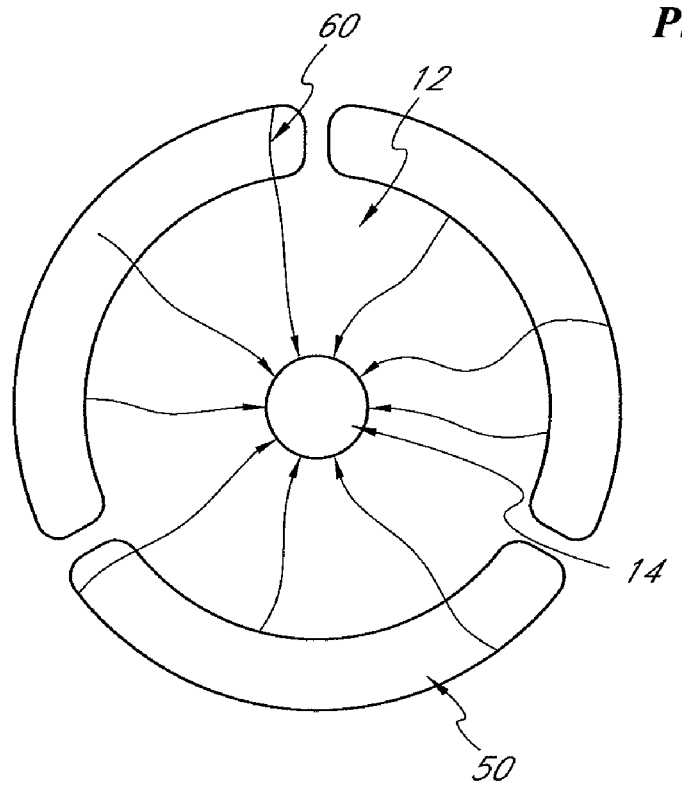
FIGS. 11A through 11C are illustrations showing comparison of vibration absorption between conventional techniques and an embodiment of the embodiment.
Figure 11A:
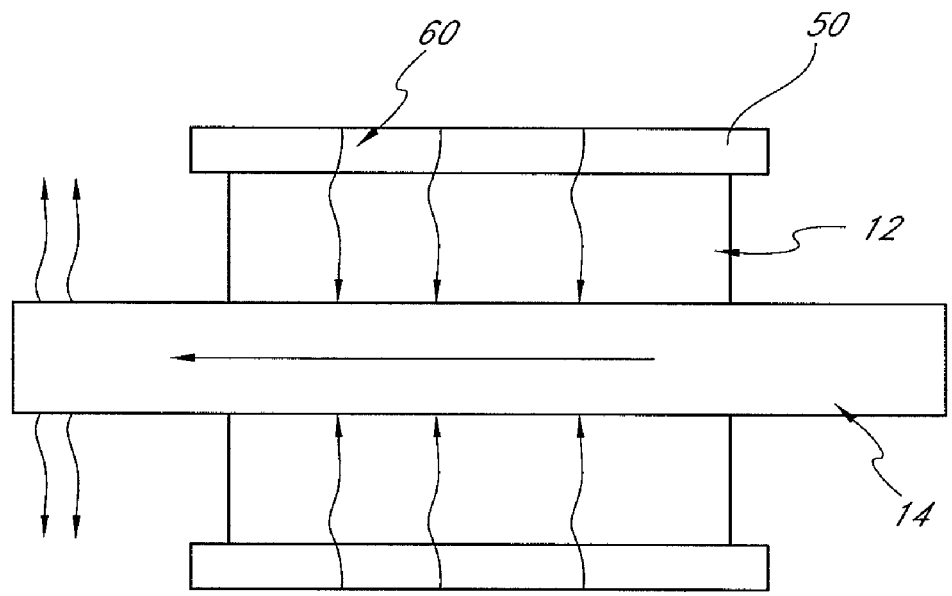
Figure 11B:
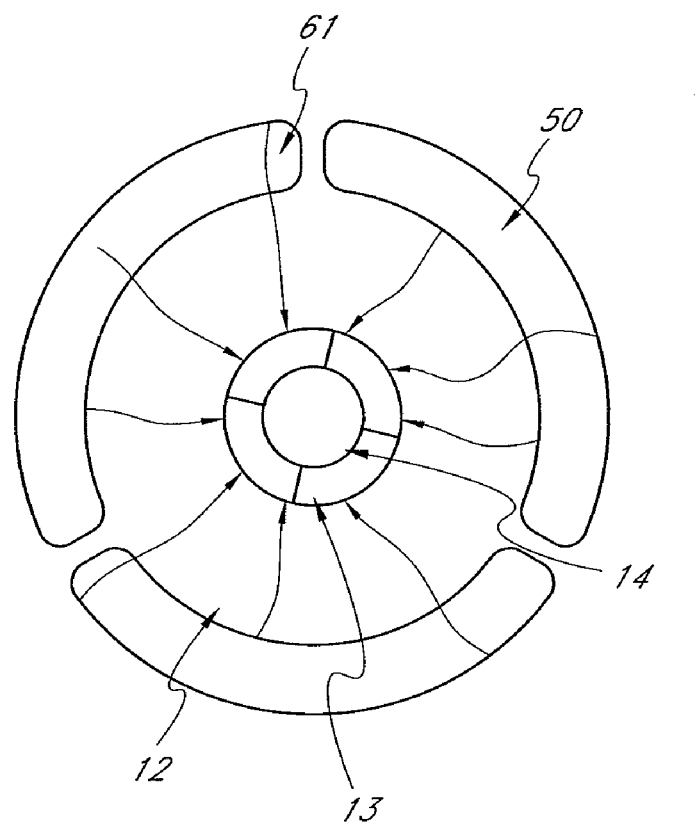
Figure 11B:
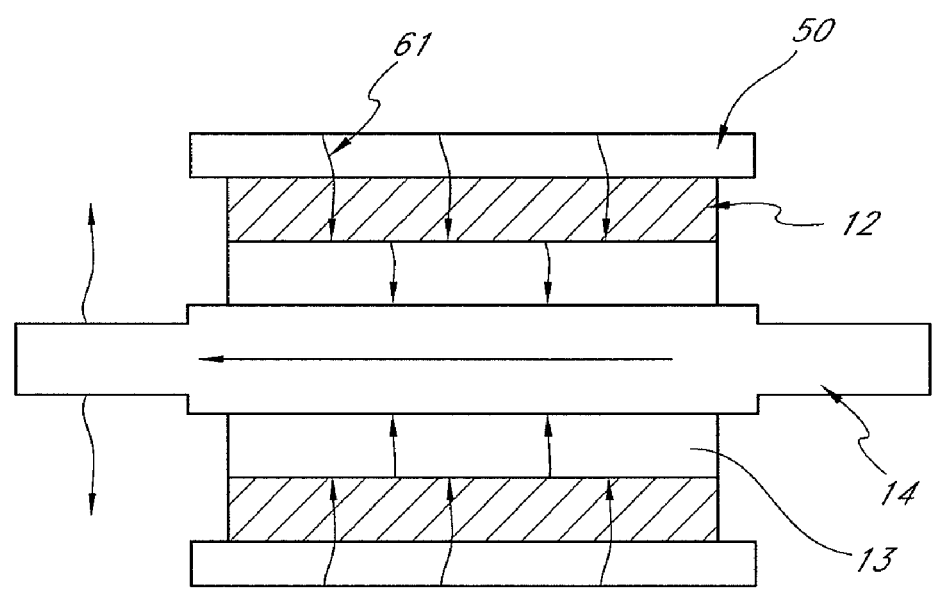
Figure 11C:
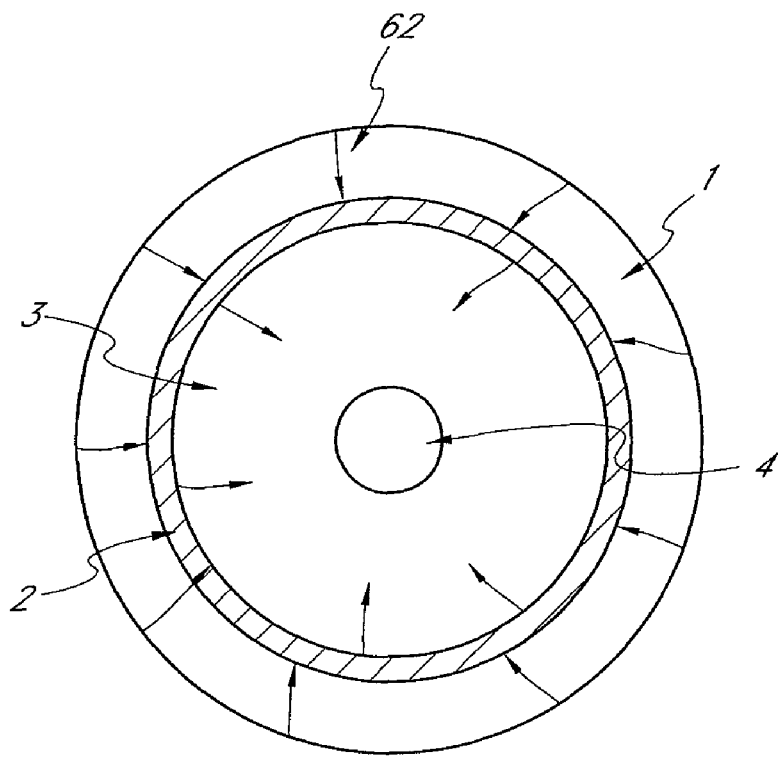
Figure 11C:
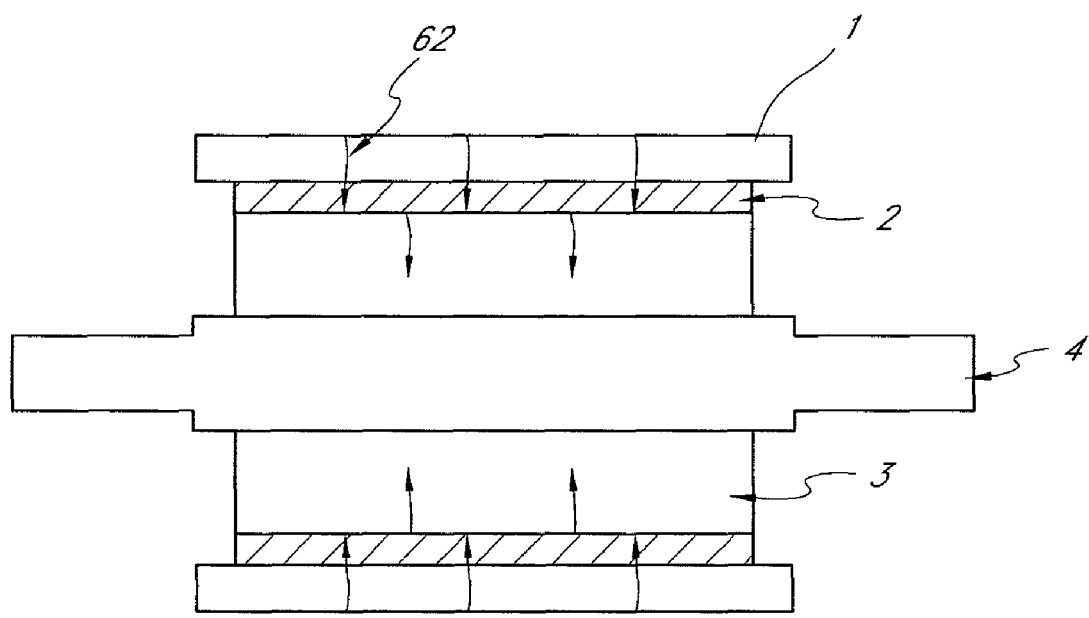

FIGS. 11A through 11C illustrate the simulated drawings for vibration being transferred to the shaft 4. As shown in FIG. 11A, vibrations 60 during the operation of an electric motor travel through magnet body 50 and ferromagnetic core 12 and finally transferred to a shaft 14. FIG. 11b illustrates an example where a rubber or a vibration absorbing part 13 is interposed between a ferromagnetic core 12 and a shaft 14. There are less vibrations being transferred to the shaft 14 as vibrations 61 are absorbed in some degree by the vibration absorbing part 13. However, the vibration absorbing part 13 is not thick enough to reduce the vibrations as ferromagnetic core 12 needs to include enough thickness to complete magnetic circuits with the stator of an electric motor. FIG. 11C illustrates an embodiment of the present disclosure. The vibration absorption portion 3 reduces vibrations 62 generated from the gaps between the rotor and a stator of the motor. The shaft 4 is substantially free of these vibrations 62.

While this disclosure has been particularly shown and described with reference to exemplary embodiments thereof, it will be understood by those skilled in the art that various changes in form and details can be made therein without departing from the spirit and scope of the disclosure as defined by the appended claims.

What is claimed is:

1. A method of making a rotor, the method comprising:
    providing an elongated shaft;
    providing a non-elastic member around at least a portion of the elongated shaft, wherein the non-elastic member comprises a plurality of through-holes through its body;
    providing one or more ring magnets over the non-elastic member;
    arranging the non-elastic member relative to the elongated shaft such that the non-elastic member and the shaft define a space therebetween; and
    injecting a precursor of an elastic material into the space, which forms the elastic material to fill the space, thereby providing a vibration absorption member between the non-elastic member and the shaft, wherein the elastic material penetrates the through-holes of the non-elastic member and further extends outwardly to form a plurality of protrusions contacting the one or more ring magnets.

2. The method of claim 1, further comprising:
forming an engagement enhancing layer over the shaft, wherein the engagement enhancing layer is interposed between the at least one portion of the elongated shaft and the vibration absorption member.

3. The method of claim 2, wherein the engagement enhancing layer is formed on a roughened surface of the shaft.

4. The method of claim 2, wherein forming the engagement enhancing layer comprises injection molding onto the shaft.

5. The method of claim 2, wherein the vibration absorption member is formed over the engagement enhancing layer and integrated with the shaft.

6. The method of claim 2, wherein a portion of the vibration absorption member contacts a portion of the shaft.

7. The method of claim 1, wherein the vibration absorption member comprises a pored structure.

8. The method of claim 1, wherein the plurality of protrusions are engaged with inner surfaces of the one or more ring magnets.

9. The method of claim 1, wherein the non-elastic member is annular and surrounding the vibration absorption member.

10. The method of claim 1, wherein the one or more ring magnets comprise a single body ring magnet, wherein the non-elastic member is not annular while being interposed between the single body ring magnet and the vibration absorption member.

11. The method of claim 1, wherein the non-elastic member comprises a ferromagnetic material.

12. The method of claim 1, wherein the non-elastic member does not comprise a ferromagnetic material.

13. The method of claim 1, wherein the non-elastic member comprises at least one of bumps and recesses on an outer circumference thereof, wherein the one or more ring magnets comprise at least one counterpart configuration configured to engage with the at least one of bumps and recesses.

14. The method of claim 1, wherein the non-elastic member is engaged with the vibration absorption member.

15. The method of claim 14, wherein the non-elastic member comprises at least one of bumps and recesses on an inner circumference, wherein the vibration absorption member comprises at least one counterpart configuration configured to engage with the at least one of bumps and recesses.

16. A method of making a motor, the method comprising:
providing the rotor made by the method of claim 1;
providing a stator comprising a plurality of stator poles; and
assembling the rotor and the stator such that the rotor is to rotate relative to the plurality of stator poles.

* * * * *

UNITED STATES PATENT AND TRADEMARK OFFICE
CERTIFICATE OF CORRECTION

PATENT NO. : 8,033,007 B2  
APPLICATION NO. : 12/192054  
DATED : October 11, 2011  
INVENTOR(S) : Young-Chun Jeung Page 1 of 1

It is certified that error appears in the above-identified patent and that said Letters Patent is hereby corrected as shown below:

Title Page, (Item 63) related U.S. Application Data, Line 4, please change "abandoned." to -- Pat. No. 8,080,907. --.

In Column 1, Line 10, please change "abandoned." to -- Pat. No. 8,080,907. --.

In Column 1, Line 12, please change "May." to -- May --.

In Column 1, Line 15, please change "2007in" to -- 2007 in --.

In Column 3, Line 13, please change, "FIG. 5" to -- FIG. 5; --.

Signed and Sealed this  
Third Day of April, 2012

David J. Kappos  
*Director of the United States Patent and Trademark Office*